UNITED STATES PATENT OFFICE.

HENRY A. CLARK, OF BOSTON, MASSACHUSETTS.

PROCESS OF DESULPHURIZING AND DEVULCANIZING WASTE VULCANIZED INDIA-RUBBER.

SPECIFICATION forming part of Letters Patent No. 236,779, dated January 18, 1881.

Application filed September 3, 1880. (No specimens.)

*To all whom it may concern:*

Be it known that I, HENRY A. CLARK, of Boston, in the county of Suffolk and State of Massachusetts, have invented certain new and useful Improvements in Process of Desulphurizing and Devulcanizing Waste Vulcanized India-Rubber, &c., of which the following is a full, clear, and exact description.

This invention relates to the treatment of waste vulcanized india-rubber, caoutchouc, &c., by which it will be desulphurized and devulcanized and converted into a suitable condition to be worked over again or revulcanized, so that it can be applied to the various purposes and uses to which india-rubber, &c., is adapted.

The invention consists in first grinding or reducing the waste pieces or articles of vulcanized india-rubber, caoutchouc, &c., to a fine condition, then boiling the same in water, and after drying thoroughly subjecting them to the vapors of heated turpentine or camphene, or other similar materials, either used separately or combined with each other, all substantially as hereinafter fully described.

To carry out this invention, first take the pieces or articles of waste vulcanized india-rubber, &c., and in any suitable grinding-machine or rolling-mill reduce the same to a fine condition—the finer the better. Then take this waste rubber, &c., which has been reduced as above described, and put it into a suitable vessel containing water, and boil the same in the water, in order to wash and thoroughly clean the waste rubber particles of all foreign substances, the water being changed from time to time as necessary. When boiled sufficiently the water is withdrawn and the waste rubber particles dried thoroughly in any convenient manner. The washed and dried particles of vulcanized rubber are then subjected to the vapors arising from heated turpentine or camphene, or any other similar material, either used alone or combined in any combination with each other a sufficient length of time to reduce the whole to a cohesive condition, which generally is accomplished in from one (1) to four (4) hours, the length of time depending upon the fineness of the rubber particles and the amount of foreign matter that may have been compounded with the rubber, &c. One mode of doing this is to put the rubber, &c., into a porous vessel or receptacle, so that while the vessel or receptacle will hold and keep the rubber particles together its porousness will allow the vapors of the heated turpentine, &c., to pass through the same and permeate and act upon the particles of rubber therein, the turpentine, &c., being heated in any desired manner. The rubber, &c., is then thoroughly dried, after which it is in a condition suitable to be worked over again or revulcanized, or used in any way desired for the purpose for which rubber is used, or for any other purposes, having been desulphurized and devulcanized.

The boiling of the particles of rubber can be dispensed with and good results obtained; but it is preferable to boil the rubber, as herein stated, and, as is obvious, vulcanized rubber, either new or old, can be treated as herein described. The rubber, &c., can be treated to the vapors of the heated turpentine, &c., in any way desired, this invention not being limited to any particular way of doing it.

Having thus described my invention, what I claim, and desire to secure by Letters Patent, is—

1. The treating of vulcanized india-rubber to the vapors of turpentine or camphene, or other similar materials, for the purpose specified.

2. The treating of vulcanized india-rubber to the vapors of turpentine or camphene, or other similar materials, after the same has been boiled in water, for the purpose specified.

In testimony whereof I have hereunto set my hand in the presence of two subscribing witnesses.

HENRY A. CLARK.

Witnesses:
 EDWIN W. BROWN,
 WM. S. BELLOWS.